United States Patent [19]
Kondo et al.

[11] Patent Number: 5,409,759
[45] Date of Patent: Apr. 25, 1995

[54] METAL ASSEMBLY

[75] Inventors: Tosiharu Kondo, Toyoake; Keiji Ito, Nagoya; Takasi Obata, Kariya; Kiyotaka Matuo, Nukata; Yasuyuki Kawabe, Okazaki; Yukikatsu Ozaki, Gamagori, all of Japan

[73] Assignees: Nippondenso Co., Ltd., Kariya; Nippon Soken Inc., Nishio, both of Japan

[21] Appl. No.: 110,172

[22] Filed: Aug. 23, 1993

[30] Foreign Application Priority Data

Aug. 24, 1992 [JP] Japan ................... 4-247252

[51] Int. Cl.⁶ .............................. B32B 3/28
[52] U.S. Cl. .................... 428/182; 428/178; 428/184; 428/192
[58] Field of Search ............... 428/182, 178, 184, 37, 428/45, 59, 72, 103, 116, 212, 906; 29/890, 463; 228/155, 181; 422/179, 180, 222; 60/299

[56] References Cited

U.S. PATENT DOCUMENTS

| | | | |
|---|---|---|---|
| 4,282,186 | 8/1981 | Nonnenmann et al. | 422/180 |
| 4,400,860 | 8/1983 | Nonnenmann et al. | 29/890 |
| 4,472,473 | 9/1984 | Davis et al. | 428/184 |
| 4,519,120 | 5/1985 | Nonnenmann et al. | 29/890 |
| 5,162,143 | 11/1992 | Porter et al. | 428/184 |

FOREIGN PATENT DOCUMENTS

| | | |
|---|---|---|
| 2856030 | 6/1980 | Germany . |
| 55-87815 | 7/1980 | Japan . |
| 63-240952 | 10/1988 | Japan . |
| 361113 | 6/1991 | Japan . |

*Primary Examiner*—Donald J. Loney
*Attorney, Agent, or Firm*—Cushman, Darby & Cushman

[57] ABSTRACT

To improve the strength of the laser weld bond between an inner honeycomb column and an outer metal case, a metal honeycomb assembly comprises a metal honeycomb column composed of a flat metal sheet and a wavy metal sheet which are mutually laminated and spirally wound together, the metal honeycomb column having an outermost circumferential portion in the form of a composite wavy sheet composed of a plurality of superposed layers of the wavy metal sheet; and a metal case fittingly enclosing the metal honeycomb column, the metal case and the metal honeycomb column being bonded together by laser-welding the wave peaks of the composite wavy sheet to an inner wall of the metal case.

7 Claims, 4 Drawing Sheets

METAL ASSEMBLY

BACKGROUND OF THE INVENTION

1. Field of the Invention

The present invention relates to a metal honeycomb assembly, particularly one useful as a catalyst carrier for exhaust gas purification.

2. Description of the Related Art

It is a recent trend that a catalyst carrier inserted in the exhaust gas path of an automobile is made of metal instead of ceramic. A metal catalyst carrier is advantageous because of a better heating property and a reduced pressure loss in comparison with a ceramic catalyst carrier.

Japanese Unexamined Patent Publication (Kokai) No. 55-87815 discloses a metal catalyst carrier in the form of a honeycomb assembly as shown in FIG. 1, which comprises a metal honeycomb column 1 composed of a flat metal sheet 2 and a wavy or corrugated metal sheet 3 laminated and spirally wound together; and a metal case 4 fittingly enclosing the metal honeycomb column 1.

Laser welding is often recently used to bond the flat and wavy sheets 2 and 3, and also to bond the outermost circumferential portion of the wavy sheet 3 to the metal case 4. Laser welding has a higher productivity than conventional brazing or soldering which requires high-temperature treatment in an inert-gas atmosphere.

However, the following problem occurs when the layer of wavy metal sheet 3 that forms the outermost portion of the honeycomb column 1 is laser-welded to the metal case 4.

The flat metal sheet 2 and the wavy metal sheet 3 are in the form of a foil as thin as about 50 μm, for example, to reduce the pressure loss and for other purposes. On the other hand, the metal case 4 has a wall thickness of several millimeters, usually about 1.5 mm, to provide the necessary strength to the catalyst carrier.

Because of this difference in thickness, a laser beam applied with a sufficient energy for penetrating the thick wall of the case 4 occasionally opens a hole in the thin wavy sheet 3, or a laser beam applied with reduced energy to prevent the formation of such a hole causes insufficient fusion, with the result that both cases can cause a poor weld-bond strength. Furthermore, premature failure occasionally occurs in the portion near the bond between the thin wavy sheet 3 and the case 4.

SUMMARY OF THE INVENTION

The object of the present invention is to provide a metal honeycomb assembly, particularly useful as a metal catalyst carrier, which has an improved strength of the weld bond between the metal case and the metal honeycomb column enclosed in the metal case and has good resistance to thermal shock.

To achieve the object according to the present invention, there is provided a metal honeycomb assembly comprising: a metal honeycomb column composed of a flat metal sheet and a wavy metal sheet which are mutually laminated and spirally wound together, the metal honeycomb column having an outermost circumferential portion in the form of a composite wavy sheet composed of a plurality of superposed layers of the wavy metal sheet; and a metal case fittingly enclosing the metal honeycomb column, the metal case and the metal honeycomb column being bonded together by laser-welding the wave peaks of the composite wavy sheet to the inner wall of the metal case.

According to another aspect of the present invention, there is provided a metal honeycomb assembly comprising: a metal honeycomb column composed of a flat metal sheet and a wavy metal sheet which are mutually laminated and spirally wound together, the metal honeycomb column having an outermost circumferential portion of the wavy metal sheet; a honeycomb-fixing member formed on the outermost circumferential portion of the metal honeycomb column and composed by superposing a plurality of layers of the wavy metal sheet; and a metal case fittingly enclosing and fixing the metal honeycomb column by means of the honeycomb-fixing member and a weld bond. The weld bond is preferably a laser-weld bond.

According to a further aspect of the present invention, there is provided a metal honeycomb assembly comprising: a metal honeycomb column composed of a flat metal sheet and a wavy metal sheet which are mutually laminated and spirally wound together, the metal honeycomb column having an outermost circumferential portion of the wavy metal sheet; a honeycomb-fixing member formed on the outermost circumferential portion of the metal honeycomb column and having a heat resistance greater than those of the flat metal sheet and the wavy metal sheet that compose the metal honeycomb column; and a metal case fittingly enclosing and fixing the metal honeycomb column by means of a weld bond. The weld bond is preferably a laser-weld bond. The flat metal sheet and the wavy metal sheet may carry a catalyst. The catalyst, preferably, may be effective for purifying the exhaust gas from an automobile.

DESCRIPTION OF THE PREFERRED EMBODIMENTS

Figure 2:
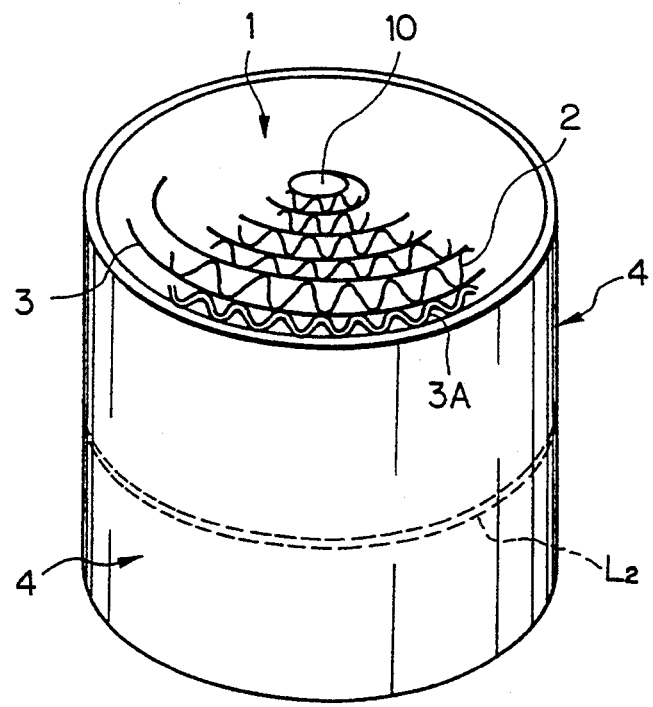
FIG. 2 shows a metal honeycomb assembly according to the present invention in perspective view.

FIG. 2 shows a metal honeycomb assembly according to the present invention comprising a metal honeycomb column 1 fabricated by laminating and spirally winding a flat metal sheet 2 and a wavy metal sheet 3 together; and a columnar metal case 4 fittingly enclosing the honeycomb column 1. The outermost circumferential portion of the honeycomb column 1 is formed of a composite wavy sheet 3A made from at least two superposed layers of the wavy sheet 3. The metal honeycomb 1 and the metal case 4 are bonded together by laser-welding the wave peaks of the composite wavy sheet 3A to the inner wall of the metal case 4.

The metal honeycomb assembly according to the present invention is advantageously applied to a metal catalyst carrier for exhaust gas purification, in which the composite wavy sheet 3A forms the outermost circumferential portion of the metal honeycomb column 1 to improve the bond strength between the honeycomb column 1 and the metal case 4 and prevents thermal shock-induced debonding between the column 1 and the case 4 thereby improving the durability of the honeycomb assembly, particularly when used as a catalyst carrier.

EXAMPLE 1

Referring to FIGS. 2 and 3, the structure of a metal honeycomb assembly according to the present invention will be described together with a process of fabricating the honeycomb assembly.

The metal honeycomb assembly shown in FIG. 2 is fabricated from a metal honeycomb column 1 and a metal case 4 enclosing the honeycomb column 1. The metal honeycomb column 1 may advantageously carry a catalyst for exhaust gas purification.

Figure 3A:
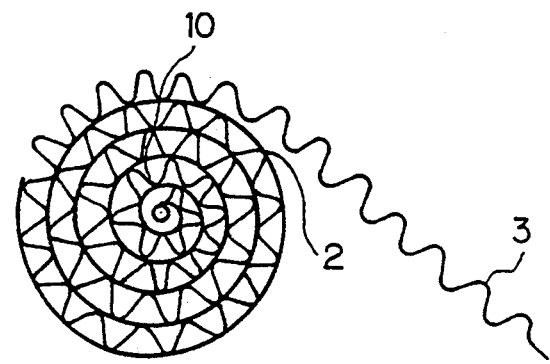
FIGS. 3A, 3B and 3C show the process steps for producing a metal honeycomb column according to the present invention in front, perspective and front views, respectively.
Figure 3B:
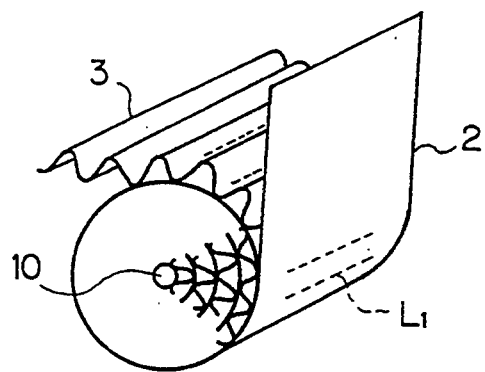

The honeycomb column 1 has many cells extending along the longitudinal axis of the column 1 and in parallel with each other to form gas paths. A flat sheet 2 and a wavy sheet 3, both of a Fe-Cr-Al alloy and 50 $\mu$m thick, are laminated with each other and spirally wound together around a mandrel 10 as shown in FIGS. 3A and 3B. The flat and wavy sheets 2 and 3 are bonded together in the outermost three turns or layers by laser-welding along the longitudinal axis of the honeycomb column 1. The welding is performed by using YAG-laser with a laser power of 35 W and an energy of 0.7 J. The broken lines $L_1$ denote the welded portions or weld lines. The welding is performed only in the intermediate portion of the column length, leaving the end portions not welded to avoid thermal stress and reduce cost.

The wavy sheet 3 is longer than the flat sheet 2 so that the excess length of the wavy sheet 3 is wound by one more turn on the previous turn of the wavy sheet 3 laser-welded to the underlying last turn of the flat sheet 2, to form a composite wavy sheet 3A of two mutually superposed layers of the wavy sheet 3. The last two turns of the wavy sheet 3 are then laser-welded together in the wave bottom portions thereof along the column axis.

Figure 3C:
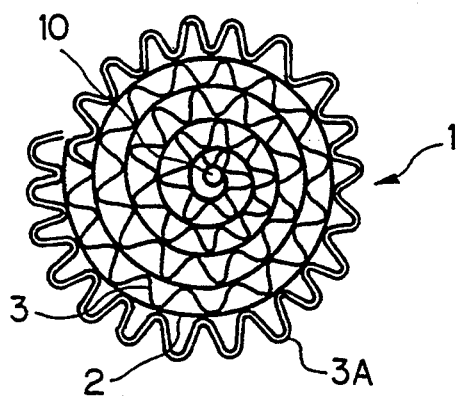

This process produces the metal honeycomb column 1 shown in FIG. 3C, in which the flat metal sheet 2 and the wavy metal sheet 3 are laminated with each other and spirally wound together and the composite wavy sheet 3A forms the outermost circumferential portion of the column 1.

The metal honeycomb column 1 is inserted into the metal case 4 and both are laser-welded together to form the metal catalyst carrier shown in FIG. 2. The metal case 4 is a hollow cylinder made from a 1.5 mm thick sheet of JIS SUS430 ferritic stainless steel. The welding is performed in a manner such that the wave peaks of the composite wavy sheet 3A are laser-welded to the inner wall of the metal case 4, forming circular weld lines $L_2$ around the case 4 about in the middle of the case length. Typical welding conditions include a laser power of about 370 W and an energy of about 20.6 J.

Figure 4A:
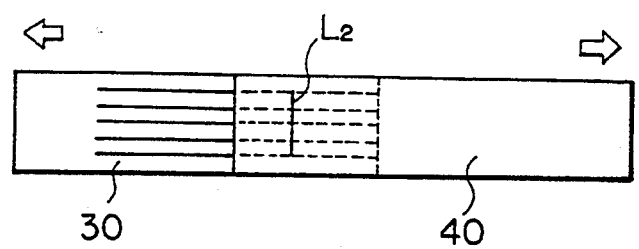
FIGS. 4A and 4B show a tensile test piece in plan view and the tensile test results, respectively.
Figure 4B:
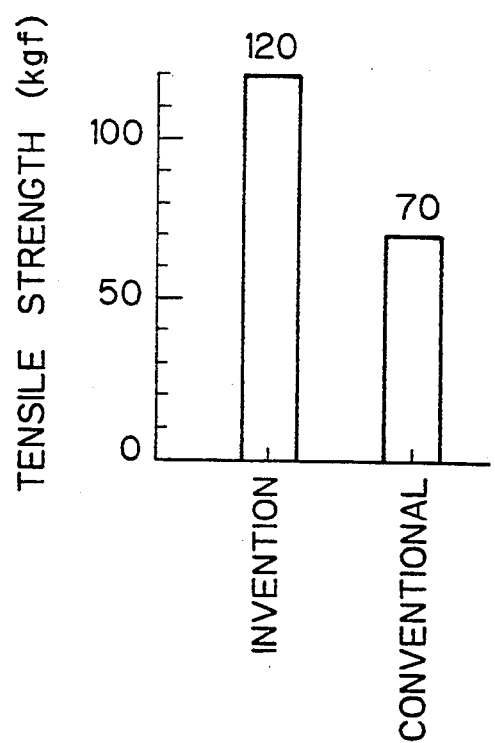

A tensile test was carried out to evaluate the strength of weld bond. FIG. 4A shows the test piece, which was prepared by superposing a 1.5 mm thick flat strip 40 of JIS SUS430 stainless steel on a 50 $\mu$m thick wavy strip 30 of a Fe-Cr-Al alloy at one end and both strips were laser-welded together along the strip width, forming a transverse weld line $L_2$. The test piece according to the present invention had two superposed layers of the wavy strip 30 whereas the test piece according to the conventional technology had one layer. The welding was performed by using YAG-laser at a power of 35 W and an energy of 0.7 J. The test results are summarized in FIG. 4B. The weld bond of the present invention had a tensile strength about two times greater than that of the conventional weld bond.

Figure 1:
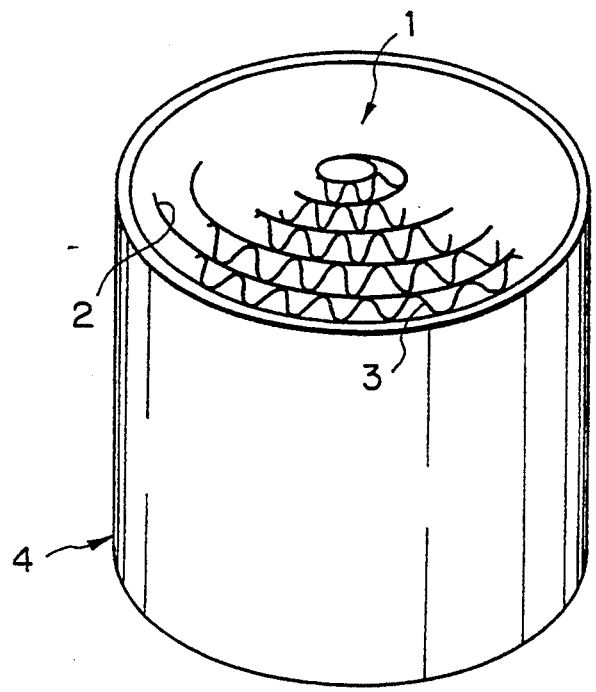
FIG. 1 shows a conventional metal honeycomb assembly in perspective view.

A thrust test was carried out on the above-produced metal honeycomb assembly of the present invention shown in FIG. 2 and the conventional assembly shown in FIG. 1. Both assemblies have the same structure, except that the present inventive metal honeycomb column 1 has an outermost portion composed of a composite wavy sheet 3A, i.e., two superposed layers of the wavy sheet 3, whereas the conventional metal honeycomb column 1 has an outermost portion composed of a single layer of the wavy sheet 3.

Figure 5B:
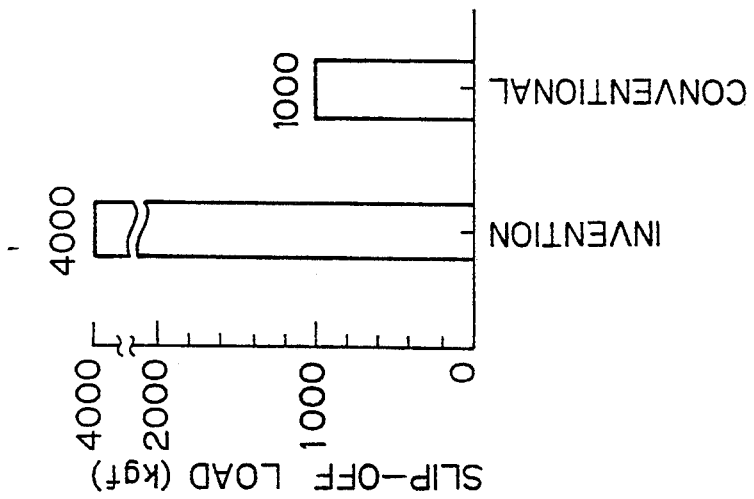
FIGS. 5A and 5B show an arrangement for thrust test and the thrust test results, respectively.
Figure 5A:
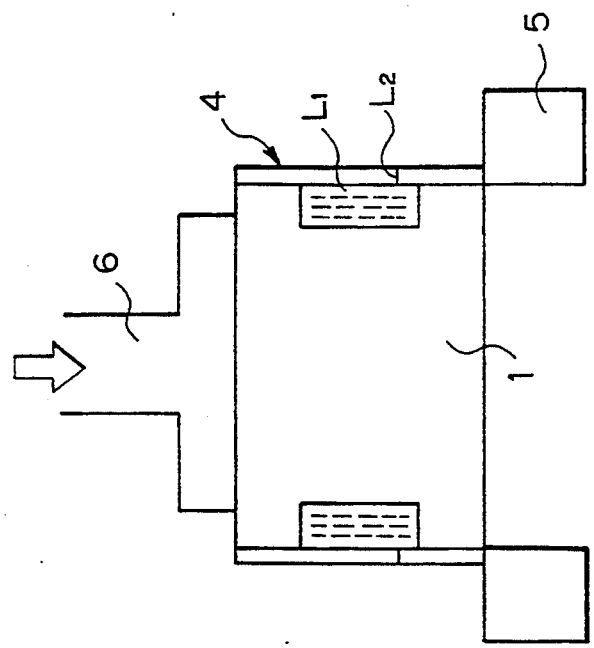

FIG. 5A shows a testing arrangement, in which an anvil 5 supports a metal honeycomb assembly by the metal case 4 thereof and a pressing bar 6 presses the metal honeycomb column 1 of the metal honeycomb assembly. The symbol $L_1$ denotes the laser-weld lines in the honeycomb column 1 and the symbol $L_2$ denotes the laser-weld lines of the metal case 4. The maximum applied thrust load, at which the honeycomb column 1 slipped off the metal case 4, was measured. The test results are shown in FIG. 5B. The metal honeycomb assembly of the present invention had a slip-off strength about four times greater than that of the conventional assembly.

The composite wavy sheet forming the outermost circumferential portion of a honeycomb column is formed by mutually superposing a plurality of layers of the wavy metal sheet to ensure a heat capacity such that no holes are formed in the sheet when subjected to a laser beam which penetrates the thick wall of the metal case. Therefore, the number of superposed layers of the wavy sheet composing the composite wavy sheet is determined in accordance with the material, thickness and other parameters of the wavy sheet and the metal case. For example, the number of superposed layers of a composite wavy sheet is suitably 2 to 4 when a 50 $\mu$m thick wavy sheet of a Fe-Cr-Al alloy and a metal case made from a 1.5 mm thick sheet of JIS SUS430 ferritic stainless steel are used.

The cross section of the metal honeycomb assembly of the present invention may unlimitedly have a circular, elliptical or other shape in accordance with need.

As hereinabove-described, the present invention provides a metal honeycomb assembly in which the outermost circumferential portion of a metal honeycomb column is laser-welded with a metal case with an improved bond strength to prevent a thermal shock-induced debonding, thereby improving the durability of the metal honeycomb assembly. The metal honeycomb column of the present invention is advantageously used as a catalyst carrier such as those used for exhaust gas purification.

We claim:

1. A metal assembly comprising:
    a metal corrugated material composed of a flat metal sheet and a wavy metal sheet which are mutually laminated and spirally wound together, said metal corrugated material having an outermost circumferential portion in the form of a composite wavy sheet composed of a plurality of superposed layers of said wavy metal sheet; and
    a metal case fittingly enclosing said metal corrugated material, said metal case and said metal corrugated material being bonded together by laser-welding wave peaks of said composite wavy sheet to an inner wall of the metal case.

2. A metal assembly comprising:

a metal corrugated material composed of a flat metal sheet and a wavy metal sheet which are mutually laminated and spirally wound together, said metal corrugated material having an outermost circumferential portion of said wavy metal sheet;

a corrugation-fixing member formed on said outermost circumferential portion of said metal corrugated material and composed of a plurality of superposed layers of said wavy metal sheet; and a metal case fittingly enclosing and fixing said metal corrugated material by means of said corrugation-fixing member and a weld bond.

3. A metal assembly according to claim 2, wherein said weld bond is a laser-weld bond.

4. A metal assembly comprising:

a metal corrugated material composed of a flat metal sheet and a wavy metal sheet which are mutually laminated and spirally wound together, said metal corrugated material having an outermost circumferential portion of said wavy metal sheet;

a corrugation-fixing member formed on said outermost circumferential portion of said metal corrugated material and having a heat resistance greater than those of said flat metal sheet and said wavy metal sheet that compose said metal corrugated material; and a metal case fittingly enclosing and fixing said metal corrugated material by means of a weld bond.

5. A metal assembly according to claim 4, wherein said weld bond is a laser-weld bond.

6. A metal assembly according to claim 4, wherein said flat metal sheet and said wavy metal sheet carry a catalyst.

7. A metal assembly according to claim 6, wherein said catalyst is effective for purifying an exhaust gas.

* * * * *